Sept. 18, 1934.  L. E. DUPUY  1,974,042
CONVEYER SYSTEM
Filed Jan. 26, 1931   3 Sheets-Sheet 3

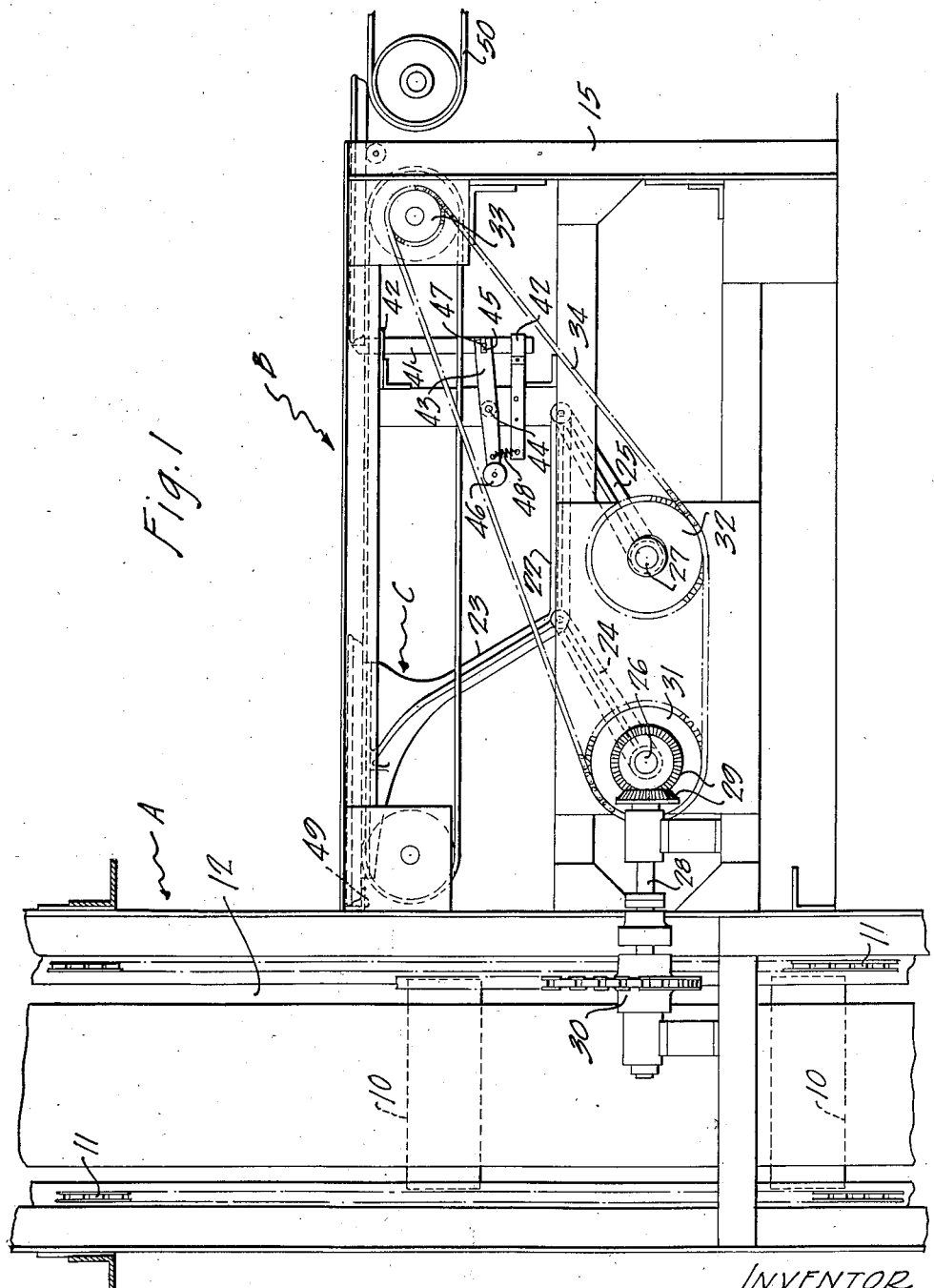

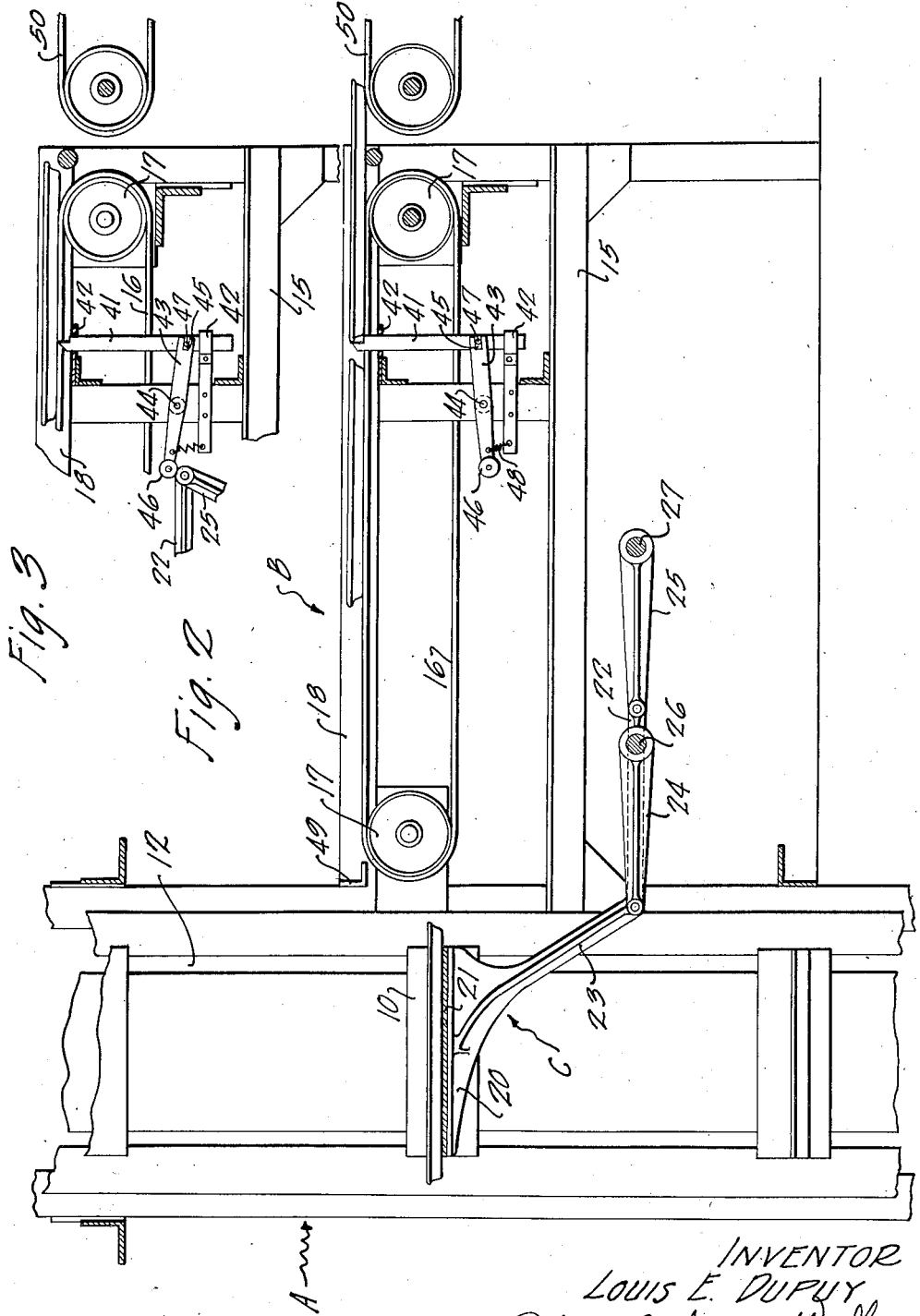

INVENTOR
LOUIS E. DUPUY
by Roberts, Cushman & Woodbury
ATTYS

Patented Sept. 18, 1934

1,974,042

UNITED STATES PATENT OFFICE 1,974,042

CONVEYER SYSTEM

Louis E. Dupuy, Syracuse, N. Y., assignor to The Lamson Company, Syracuse, N. Y., a corporation of Massachusetts Application January 26, 1931, Serial No. 511,141

6 Claims. (Cl. 198—26)

This invention relates to an improvement in a conveyer system, and more particularly in means for transferring loads between a platform and a relatively moving conveyer whereby the conveyer is loaded with articles from the platform or articles carried by the conveyer are unloaded upon the platform.

The primary object of this invention is to provide in combination with a conveyer, more particularly though not necessarily a conveyer of the vertically moving type having spaced load carrying flights, a traveling arm adapted to enter and leave the conveyer well with an orbital movement, on which arm articles are transported between the load supporting portions of the conveyer and a load supporting platform.

A further object of this invention is to provide in combination with a conveyer, including load supporting means, traveling in a vertical well, a traveling arm having an orbital movement into and out of the conveyer well at a rate of travel different from that of the load supporting means whereby articles are transferred between the supporting means and the traveling arm.

Another object of this invention is to provide in combination with a conveyer including load supporting means traveling in a vertical well in a definite direction, a traveling arm having an orbital movement into and out of the conveyer well in a direction opposite to that of the load supporting means whereby articles are transferred between the supporting means and the traveling arm.

Other objects of this invention reside in the details of construction and operation of various embodiments thereof as will appear from an examination of the following specification and of the drawings which form a part thereof and in which:

Fig. 1 is a side elevation of one embodiment of this invention;

Fig. 2 is a side elevation partially in section with the traveling arm in the conveyer well in engagement with an article resting upon the load supporting means;

Fig. 3 is a detail view partially in section illustrating one stage in the operation of this embodiment.

Figure 4:
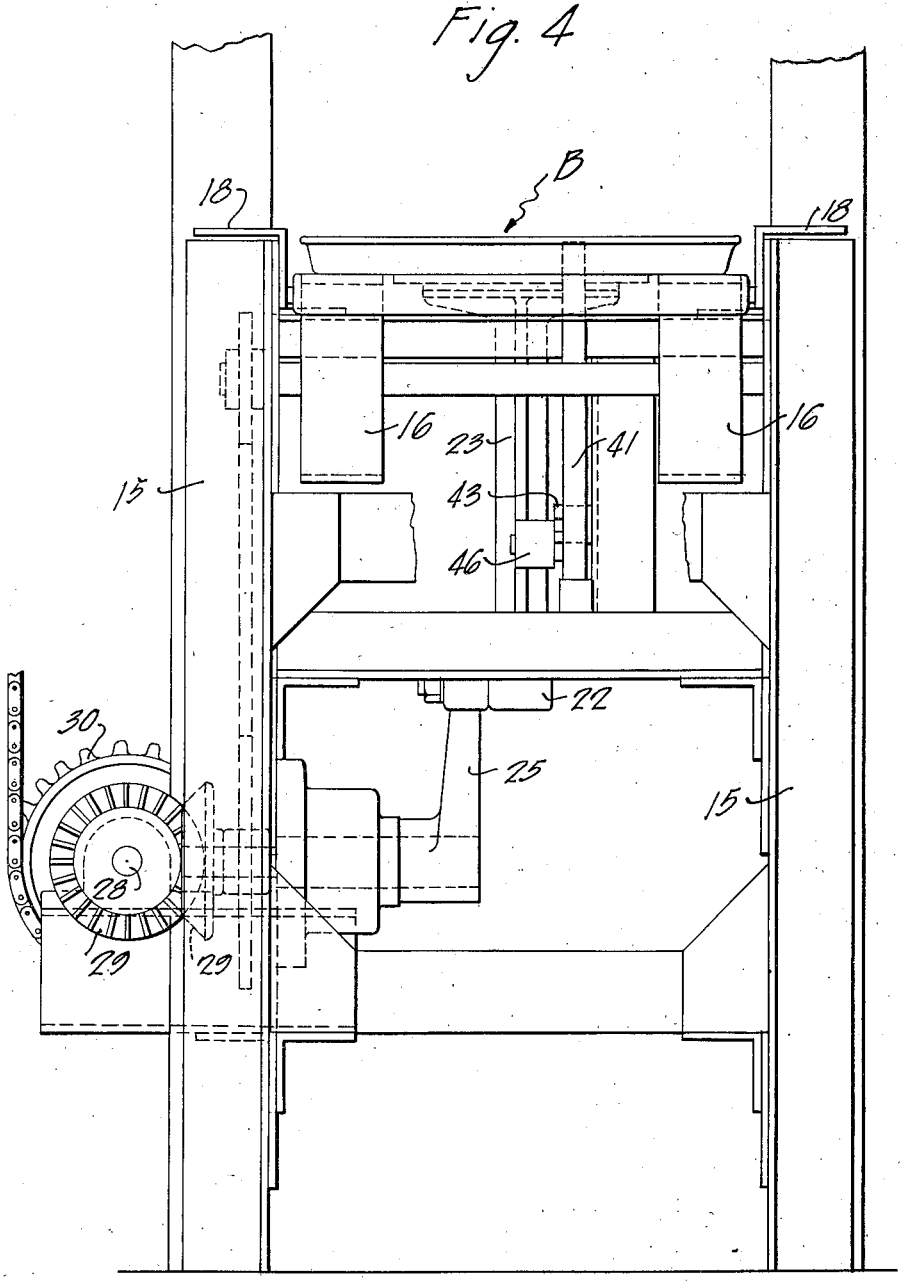
Fig. 4 is an end elevation of the embodiment.

The embodiment of this invention selected for illustration includes a conveyer A having pairs of spaced load supporting flights 10 carried by chains 11 or similar endless means and traveling in a vertical well 12. The chains 11 are driven by any suitable prime mover (not shown) and the flights may travel upwardly or downwardly according to the requirements of the particular installation. Mounted adjacent the conveyer A is a station B which includes a frame 15 at the upper portion of which are two belts 16 spaced apart and carried upon and driven by pulleys or rollers 17. The articles being treated, here shown as trays, are supported upon the belts and advanced to or retracted from the conveyer according to the direction of travel of the belts 16. Suitable side rails 18 are provided between which the belts 16 travel.

The trays are transferred between the conveyer flights and the station belts by an arm C having at its upper end a tray supporting head 20 which is at all times horizontally disposed. In order to prevent slipping of the trays while in transit a piece of rough fabric as, for example, belting 21 is secured to the head. The head 20 is of such dimension transversely that it can pass freely between the conveyer flights 10 and between the station belts 16. The arm C comprises a horizontal section 22 and an inclined section 23 connecting the section 22 to the head 20. The section 22 is supported upon parallel links 24 and 25 of the same length and carried by shafts 26 and 27 respectively so that the section 22 and head 20 are kept horizontal at all times while the arm is given an orbital movement upon the rotation of the shafts 26 and 27.

The shafts 26 and 27 are driven in any suitable manner, as for example through a shaft 28, suitably supported upon the station frame. The shaft 28 is connected at one end to the shaft 26 through intermeshing gears 29 and is driven through a chain and sprocket unit 30 by the prime mover for the chains 11 or by any suitable prime mover operating in synchronism with the conveyer flights. Mounted on the shafts 26 and 27 and on the shaft of the rear pulley 17 are sprockets 31, 32 and 33 respectively around which passes a chain 34 so that the shafts and pulleys travel in unison.

When the station B is used as a loading station, the shafts and pulleys are given a counterclockwise movement so that the belts 16 will advance the trays carried thereby toward the conveyer and the arm C will raise the trays from the belts and transfer them to the flights 11. If, on the other hand, the station B is used as an unloading station, the shafts and pulleys are rotated clockwise so that the belts move the trays carried thereby away from the conveyer and the arm C will raise the trays from the flights and deliver them to the belts.

Means may be provided so that if trays are to be loaded at station B the trays are advanced by the belts at regular intervals. Such means may be a movable stop between the belts 16, projecting in one position into the path of travel of the trays and in the other position being retracted below such path. The stop here shown comprises a rod 41 mounted for vertical reciprocation in guides 42 carried by the station frame. A bar 43 pivotally mounted at 44 intermediate its ends upon a suitable support has at one end a longitudinally extending slot 45 and at the other end a roller 46. The rod 41 carries a pin 47 which enters the slot 45 and a spring 48 acts upon the roller end of the bar 43 so that the upper end of the rod normally projects into the path of the trays. Suitable means (not shown) are provided to limit the upward movement of the rod through its guides. The roller 46 is normally in the path of travel of the horizontal section 22 of the arm C and when contacted thereby the rod 41 is retracted, allowing a tray to advance on the belts 16. Thus only one tray at a time is on the belts in advance of the stop and all danger of collision between two trays is avoided.

The movement of the tray by the belts may be synchronized with that of the arm so that the head 20 will lift the tray just as it arrives at the proper position. However, it has been found advisable to provide a fixed stop 49 against which the tray is brought by the belts. The trays are supplied to the belts 16 in any desired manner, as by a conveyer 50.

From the above description it will be apparent that when the trays are being transferred to the conveyer flights the head 20 of the arm C rises between the belts 16, removes a tray, carries it into the conveyer well, places it upon conveyer flights 10 and then descends between the flights and out of the well. When trays are being transferred from the flights to the belts 16 the arm C enters the conveyer well below the flights on which the tray to be removed is supported, passes upwardly between the flights, raises the tray therefrom, carries it out of the well, places it upon the belts 16 and then descends between the belts, which withdraw the tray from the well. If the trays are transferred from the belts to the conveyer while the flights are descending or to the belts from the conveyer while the flights are rising it will be understood that it is necessary that the arm travel at a speed greater than that of the conveyer. It has also been found desirable though not essential to have the arm travel at such increased speed relative to that of the conveyer when transferring trays to an upwardly travelling conveyer or from a downwardly travelling conveyer.

While one embodiment of this invention has been shown and described it will be understood that I am not limited thereto since other embodiments may be made without departing from the spirit and scope of the invention as set forth in the following claims.

I claim:

1. In a conveyer system comprising a conveyer having laterally spaced load supporting flights traveling continuously in a vertical path through a well and a station adjacent said well, a loading platform at such station including a pair of horizontally spaced belts traveling continuously to transport articles toward the well, a fixed stop against which articles are delivered by the belts, movable means for limiting the number of articles checked at one time by the fixed stop, an arm having a load supporting surface and movable in an orbital path upwardly between the belts to remove the articles on the belts checked by the fixed stop, and into and out of the conveyer well between the supporting flights to deliver the articles removed from the belts to the flights, and means for moving the arm and actuating the movable limiting means in synchronism.

2. In a conveyer system comprising a conveyer having laterally spaced load supporting flights traveling continuously in a vertical path through a well and a station adjacent said well, a loading platform at such station including a pair of horizontally spaced belts traveling continuously to transport articles toward the well, a fixed stop against which articles are delivered by the belts, and a movable stop between the belts for limiting the number of articles checked at one time by the fixed stop, an arm having a load supporting surface and movable in an orbital path upwardly between the belts to remove the articles on the belts checked by the first stop and into and out of the conveyer well between the supporting flights to deliver the articles removed from the belts to the flights, and means for moving the arm and retracting the movable stop in synchronism.

3. In a conveyer system comprising a conveyer having laterally spaced load supporting flights traveling continuously in a vertical path through a well and a station adjacent said well, a loading platform at such station including a pair of horizontally spaced belts traveling continuously to transport articles toward the well, a fixed stop against which articles are delivered by the belts, and a movable stop between the belts for limiting the number of articles checked at one time by the fixed stop, an arm having a load supporting surface and movable in an orbital path upwardly between the belts to remove the articles of the belts checked by the first stop and into and out of the conveyer well between the supporting flights to deliver the articles removed from the belts to the flights, and means for moving the arm and retracting the movable stop temporarily as the arm removes the articles from the belt.

4. In a conveyer system comprising a conveyer traveling in a vertical well and having horizontally spaced load supporting flights, and a station adjacent the conveyer well, a pair of parallel, horizontally spaced load supporting and transporting belts, and a pair of horizontally spaced stops at the station, a load supporting and transferring element at the said station movable in an orbital path which passes into and out of the conveyer well and through the space between the belts, the space between the stops, and the space between the flights, and means continuously and unisonly operating the conveyer in the well and the belts at the station, and moving the element through the path, the belts and element traveling in the same direction so that when the belts transport loads toward the well to the stops, such loads are transferred by the element from the belts to the flights and when the belts transport loads away from the stops and well, loads are transferred by the element from the flights to the belts.

5. In a conveyer system comprising a conveyer continuously traveling in a vertical well and having horizontally spaced load supporting flights and a station adjacent the conveyer well, a pair of parallel, horizontally spaced load supporting and transporting belts at the station, a load supporting and transferring element at the station movable in an orbital path which passes into and out of the conveyer well and through the space between the flights and through the space between the belts, and means for driving the belts and moving the element through the path unisonally with the travel of the conveyer and in the same direction, so that when the belts transport loads toward the well such loads are transferred by the element from the belts to the flights, and when the belts transport loads away from the well, loads are transferred by the element from the flights to the belts, said means including a shaft driven unisonally with the conveyer, a link transmitting motion from said shaft to said element and a chain and sprocket drive transmitting motion from said shaft to said belts.

6. In a conveyer system comprising a conveyer continuously traveling in a vertical well and having horizontally spaced load supporting flights and a station adjacent the conveyer well, a pair of parallel, horizontally spaced load supporting and transporting belts at the station, a load supporting and transferring element at the station movable in an orbital path which passes into and out of the conveyer well and through the space between the flights and through the space between the belts, and means for driving the belts and moving the element through the path unisonally with the travel of the conveyer and in the same direction, so that when the belts transport loads toward the well such loads are transferred by the element from the belts to the flights, and when the belts transport loads away from the well, loads are transferred by the element from the flights to the belts, said means including a shaft driven unisonally with the conveyer, a second shaft parallel to the first shaft, a chain and sprocket drive transmitting motion from said first shaft to said second shaft, and to said belts and links transmitting motion from both said shafts to said element.

LOUIS E. DUPUY.